F. CONRAD.
ELECTRICAL SYSTEM.
APPLICATION FILED DEC. 31, 1913.
1,260,648.
Patented Mar. 26, 1918.
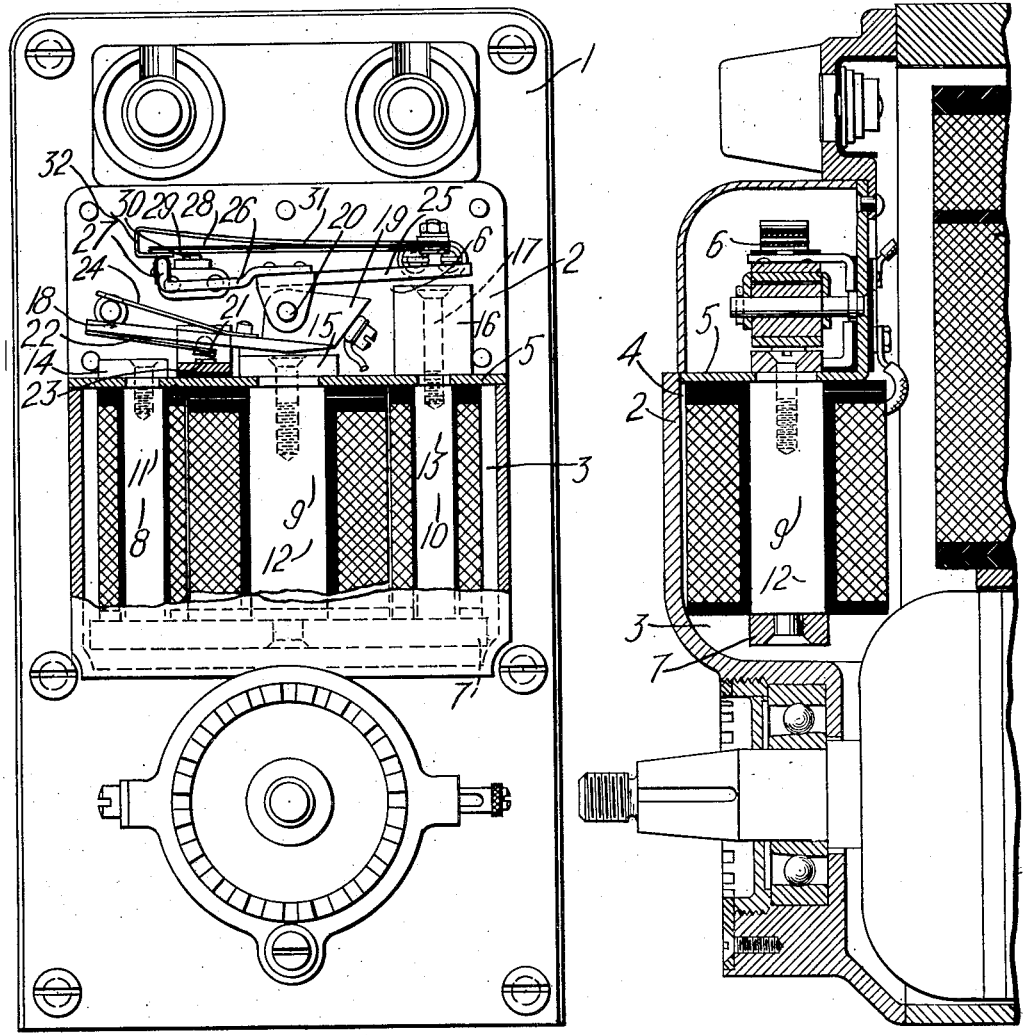
Fig. 1.
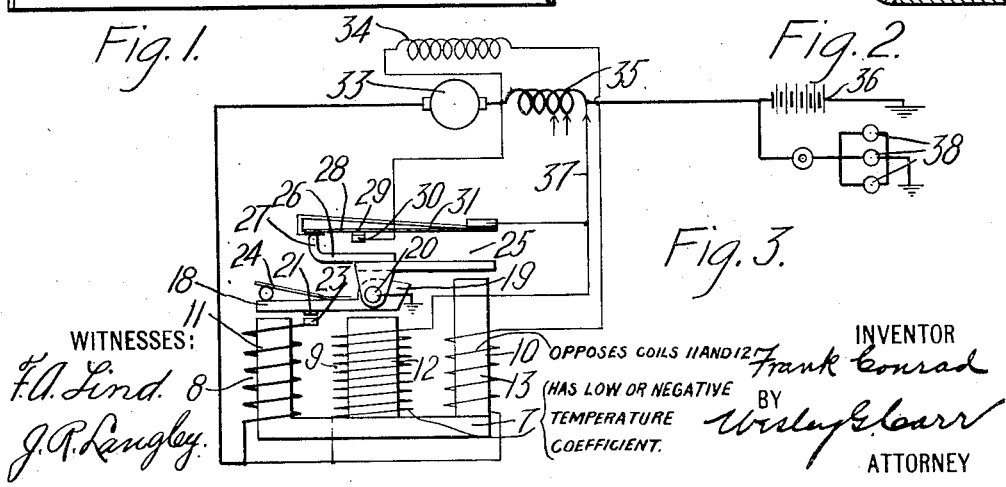
Fig. 2.
Fig. 3.
WITNESSES:
F. A. Lind.
J. R. Langley.
INVENTOR
Frank Conrad
BY
Wesley G. Carr
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,260,648.　　　Specification of Letters Patent.　　Patented Mar. 26, 1918.

Application filed December 31, 1913. Serial No. 809,637.

*To all whom it may concern:*

Be it known that I, FRANK CONRAD, a citizen of the United States, and a resident of Pittsburgh, in the county of Allegheny and State of Pennsylvania, have invented a new and useful Improvement in Electrical Systems, of which the following is a specification.

My invention relates to electrical systems, and it has particular reference to such systems as may be employed to control the storage of energy by means of secondary batteries.

My invention has for one of its objects to provide a simple and effective means for controlling the rate at which storage batteries may be charged to correspond to the degree to which the batteries are charged.

A second object of my invention is to provide a means for regulating the rate at which storage batteries may be charged to correspond to the relative temperatures of the batteries and for insuring that the batteries will always receive a preliminary charge.

It is well known that, in the operation of charging storage batteries, it is highly desirable that the rate at which energy is stored be much higher during the earlier than during the later part of the operation. When batteries are employed for intermittent and irregular service, such as supplying power for the starting motors of automobiles or other motor vehicles, it is important that they be charged as rapidly as is consistent with good practice, in order that power may be available at all times. Care must be taken, however, not to charge the battery during the later portion of the operation at the same rapid rate that is employed in the beginning.

It is desirable also, when the temperature of the battery is very low, to apply a higher voltage than that employed when the temperature is higher. When the battery has not been in use for some time, it is desirable to give the battery a preliminary charge in order to neutralize the effects of local action during the period in which the battery was not in use, although the voltage of the battery may be normal.

I have provided a means whereby the voltage that is applied to the storage battery is automatically reduced when the latter is charged to a predetermined degree. In carrying out my invention, I employ a generator having series and shunt field windings that are wound to oppose each other. The series field winding is short-circuited until the battery has received a predetermined portion of a full charge. An automatic circuit-controlling device controls the connections of the field windings and the connection of the generator to the storage battery.

In the accompanying drawings, Figure 1 is an end view, partially in elevation and partially in section, of an electric generator having an automatic controlling device applied thereto. Fig. 2 is a side view, partially in elevation and partially in section, of the apparatus shown in Fig. 1, parts being broken away. Fig. 3 is a diagrammatic view of circuits and apparatus embodying my invention.

Referring particularly to Figs. 1 and 2, an electric generator 1 comprises an end casing 2 having a chamber or recess 3 and an opening 4 above the chamber 3 that is covered by a removable cover member 5 of non-magnetic material. An automatic circuit-controlling mechanism 6 is attached to and supported by the cover member 5.

The controlling mechanism 6 comprises a base member 7 of magnetic material having upright posts or leg members 8, 9 and 10 which are attached, at their lower ends, to the base member 7. The leg members 8, 9 and 10 constitute core members for magnet coils 11, 12 and 13, respectively. The leg members 8, 9 and 10 are provided with pole pieces 14, 15 and 16, respectively, that are supported upon the plate member 5 outside the chamber 3. The corresponding leg members and pole pieces are clamped to the plate member 5 by suitable screws 17.

An armature 18, which bridges the pole pieces 14 and 15, is attached at one end to a block member 19 having a pivotal support indicated at 20. A contact member 21, which is attached to the armature 18 by means of a spring 22, coacts with a stationary contact member 23 that is mounted upon and insulated from the cover member 5. Normally, a spring 24 holds the armature 18 in its upper position with the contact members 21 and 23 disengaged.

An armature 25, which bridges the pole pieces 15 and 16, also has a pivotal support at 20 and is provided with a rearwardly extending arm 26 having an upright portion 27. A spring 28, which is supported at one end by the cover member 5 and is insulated therefrom, is provided, at its opposite end, with a contact member 29. A stationary contact member 30 is supported by, and insulated from, the cover member 5 to coact with the contact member 29. A spring 31, which is bent at one end to form a hook 32, normally bears against the upright portion 27 of the arm 26 to maintain the armature 25 in its upper position with a space separating the hook portion 32 and the spring 28. The spring 31 is weaker than the spring 28 and the lost-motion connection between the arm 26 and the spring 28 allows the armature 25 to be drawn downwardly through a portion of its path of movement before the tension of the spring 28 is added to that of the spring 31 to oppose the corresponding upward movement of the arm 26.

The circuits and apparatus embodied in my invention are diagrammatically illustrated in Fig. 3. The generator 1, the armature of which is indicated at 33, is provided with a shunt field winding 34 and a series field winding 35 which is wound to oppose the shunt field winding. The coils 11 and 12 of the control mechanism 6, which are in series and in shunt, respectively, with the generator armature 33, normally assist each other to energize a magnetic circuit which includes the armature 18. The coil 12 is composed, either wholly or in part, of a material or metal or alloy having a very low or, preferably a negative temperature coefficient.

The coil 13, which constitutes a differential or compensating winding, is wound to oppose the flux produced by the coil 12 and traversing a magnetic circuit comprising the armature 25 and the leg member 10. The flux produced by the coil 12 predominates over that produced by the coil 13. The number of ampere-turns of the coil 12 is, preferably, several times that of the ampere-turns of the coil 13. The effect of the coil 11 upon the magnetic circuit comprising the armature 25 is practically negligible because of the relatively small magnetizing effect exerted by it and the slight effects produced by variations in the current traversing it. When the temperature of the shunt field winding 34 is relatively low, as, for example, when the generator is first operated, the resistance of the field winding is correspondingly low, and a relatively heavy current will flow through it, and the coil 13 will be correspondingly energized to an increased degree to oppose the coil 12. The shunt coil 12, which has a negligible temperature coefficient, receives substantially the same current as at a higher temperature. The result is to delay the actuation of the armature 25 until the voltage has reached a higher value than that at which the armature 25 is normally drawn downwardly. A short circuit for the series field winding 35 is controlled by the armature 25 and the contact members 29 and 30.

Normally, the armatures 18 and 25 are in their respective upper positions, with the contact members 21 and 23 disengaged and the contact members 29 and 30 connected to short circuit the series field winding 35. When the generator voltage has increased to a predetermined value, the shunt coil 12 will be sufficiently energized to draw the armature 18 downwardly to connect the contact members 21 and 23. The charging circuit of the generator, which is thus completed, extends from the positive brush of the generator through the contact members 29 and 30, armature 28, a battery 36, to ground, block member 19, which is grounded, armature 18, contact members 21 and 23 and series coil 11 to the negative brush of the generator. The series coil 11 now acts as a holding coil to assist the shunt coil 12 in retaining the armature 18 in its lower position. The battery will then be charged by the generator, which operates as a shunt wound machine, the differential series field winding 35 being short circuited. It may be desirable to short circuit only a portion of the field winding 35 and this may be arranged by varying the point at which the conductor 37 is connected to the field winding 35.

As the charging operation progresses, the voltage of the battery rises to a degree corresponding to the quantity of energy stored therein. The generator voltage rises during the charging operation because the terminals of the battery are connected to the terminals of the shunt field-magnet winding. As the electromotive force of the battery gradually increases, the current traversing the shunt field-magnet winding 34 increases, also, and the voltage of the generator rises to a corresponding degree.

An increase in the generator voltage causes a corresponding increase in the value of the current traversing the coil 12. The current traversing the coil 13 increases, also, but, since the ampere-turns of the coil 12 greatly exceed those of the coil 13 in number, the effective ampere-turns for energizing the magnetic circuit including the armature 25 increase. When the battery is charged to a predetermined degree, at which the electromotive forces of the battery and the generator have reached predetermined values, the armature 25 is drawn downwardly. The arm 26 separates the contact members 29 and 30 and thereby opens the shunt circuit for the series field-magnet winding 35. The latter then opposes the shunt field-magnet winding 34 and the generator operates as a compound-wound machine at a reduced voltage. The battery is then charged at a comparatively low rate.

In case the speed of the generator decreases to such rate that its voltage is less than that of the battery, current tends to flow in the reverse direction through the series coil 11, and the latter then opposes the magnetizing effect of the coil 12. The armature 18 then opens to break the charging circuit at contact members 21 and 23.

The armature 25 is controlled, also, in accordance with temperature conditions. During the charging operation, the temperatures of the several windings and battery rise. The resistance of the coil 12, which has a negligible temperature coefficient, remains substantially constant, thereby causing the current which traverses it to have a substantially constant value. The current traversing the shunt coil 12 varies substantially in accordance with the voltage of the generator.

An increase in the temperature of the shunt field-magnet winding 34 materially increases its resistance and a correspondingly smaller current traverses the coil 13 which opposes the magnetizing effect of the coil 12. From the above, it will be apparent that the effective ampere-turns of the coils 12 and 13 for drawing the armature 25 downwardly increase as the temperatures of the several windings and battery increase. When the temperatures have increased to such degree that the effective ampere-turns reach a predetermined value, the armature 25 is drawn downwardly to open the shunt circuit for the series field-magnet winding 35. The current traversing the charging circuit is reduced because the voltage of the generator has been decreased. The operation of the mechanism in accordance with temperature conditions thus safeguards the dynamo-electric machine by preventing the flow of a relatively heavy current when the temperatures of the several winding are such that a further increase may cause damage to the machine.

The voltage of the generator, at the instant of the operation of the armature 25, varies in accordance with temperature conditions. Since the battery and the generator are, ordinarily, subjected to the same atmospheric conditions, the initial temperatures of the battery and the several field-magnet windings and coils are substantially the same. The temperature of each of the several devices rises during the charging operation but the temperatures at corresponding periods of the charging process are lower during cold weather than during warm weather.

The armature 18 is controlled by the force of the coil 12 and the latter is energized in accordance with the voltage of the generator. Accordingly, the charging circuit is completed at a predetermined voltage of the generator, regardless of temperature or other conditions. When the temperatures of the several windings are relatively low, as, for example, in winter, the operation of armature 25 to reduce the voltage of the generator is directly affected by temperature conditions.

When the temperature of the atmosphere is relatively low, the current traversing the shunt coil 12 is substantially that obtaining for the same voltage of the generator at higher temperatures by reason of the fact that it has a low or negative temperature coefficient. The resistance of the shunt field-magnet winding 34, which greatly exceeds that of the coil 12, is, however, materially reduced and the value of the current traversing the coil 13 is correspondingly increased.

The result is to cause the coil 13 to oppose the coil 12 with a force greater than that obtaining at normal temperatures. The operation of the armature 25 is delayed until the voltage of the generator has reached a value sufficiently greater than the normal value to insure that the additional ampere-turns of the coil 12 shall compensate for the increased opposition of the coil 13. This arrangement insures that, during cold weather, the battery is charged more rapidly than during warm weather. The voltage of the generator is not reduced until the battery is charged to a predetermined degree that is somewhat greater than that obtaining at higher temperatures. This feature is particularly desirable in view of the heavier demands upon the batteries of motor vehicles in winter, or during cold weather.

The controlling mechanism operates to control the voltage of the generator in accordance with the degree to which the battery is charged. The voltage of the generator is reduced also when the temperatures of the field-magnet windings and magnetizing coils reach predetermined values which approach the limits for safe operation. The voltage of the generator is permitted to reach a higher value before being reduced when lower temperature values obtain.

I claim as my invention:

1. In an electrical system, the combination with a generator, and a storage battery electrically connected thereto, of means for controlling the electrical connections of said generator to said battery, for controlling the voltage of said generator according to battery conditions and for automatically varying the voltage at which said voltage controlling means operates according to temperature conditions of said controlling means.

2. In an electrical system, the combination with a generator having a shunt field winding and a series field winding, of a battery in circuit with said generator, and a circuit-controlling mechanism comprising a magnet coil connected in series with said shunt field winding, a second magnet coil connected in parallel with the generator armature, and a third magnet coil connected in series with said series field winding and said battery.

3. In an electrical system, the combination with a generator and a storage battery in circuit therewith, of a mechanism for controlling the electrical connections of said generator and said battery, said mechanism comprising an electromagnet having a plurality of core members, windings on said core members electrically connected to said generator, an armature controlled by two of said windings which assist each other, a second armature controlled by two of said windings which oppose each other, and contact members controlled by said armatures.

4. In an electrical system, the combination with a generator, of a circuit-controlling mechanism electrically connected to said generator and comprising an electromagnet having two magnetic circuits, a plurality of core members, one of which is common to both magnetic circuits, coils on said core members, two of said coils being wound to assist each other and one of said coils being wound to oppose the others, an armature in each magnetic circuit, and contact members controlled by said armatures.

5. In an electrical system, the combination with a generator, of a mechanism for controlling the electrical connections of said generator comprising an electromagnet having two magnetic circuits, one of which forms a leakage path for the other, a core member in one of said magnetic circuits, coils for energizing the magnetic circuit comprising said core member to magnetically saturate the same, movable armatures in said magnetic circuits, and contact members controlled by said armatures.

6. In an electrical system, the combination with a generator, of means for reducing the voltage of said generator when the temperature of said generator reaches a predetermined value, said means comprising an electromagnet having energizing coils respectively in series-circuit relation to the armature winding and a field-magnet winding of said generator.

7. In an electrical system, the combination with a generator, of means for reducing the voltage of said generator when the temperature of said generator reaches a predetermined value, said means comprising two coils, the magnetizing effects of which vary at different rates upon variations in the temperature conditions of said generator.

8. In an electrical system, the combination with a generator, of means for reducing the voltage of said generator when the temperature of said generator reaches a predetermined value, said means comprising an electromagnet, the force of which varies in accordance with temperature conditions of the generator.

9. In an electrical system, the combination with a generator and a battery in circuit therewith, of means for reducing the voltage of said generator when the battery is charged to a predetermined degree, said means comprising a pair of opposing coils, the magnetizing effects of which vary at different rates upon variations in temperature conditions of said generator.

10. In an electrical system, the combination with a generator and a battery in circuit therewith, of means for reducing the voltage of said generator when the battery is charged to a predetermined degree, said means comprising a pair of opposing coils, the magnetizing effects of which vary at different rates upon like variations in their respective temperatures.

11. In an electrical system, the combination with a generator and a battery in circuit therewith, of means for reducing the voltage of said generator when the battery is charged to a predetermined degree and for varying the voltage of the generator at which the reduction in voltage occurs in accordance with temperature conditions of the voltage-reducing means.

12. The combination with an electrical generator having a casing, of means mounted within said casing and subject to the temperature conditions prevailing therein for varying the field-magnet strength of the generator in accordance with an electrical condition of the generator and with said temperature conditions.

In testimony whereof, I have hereunto subscribed my name this 29th day of Dec., 1913.

FRANK CONRAD.

Witnesses:
J. R. LANGLEY,
B. B. HINES.